UNITED STATES PATENT OFFICE.

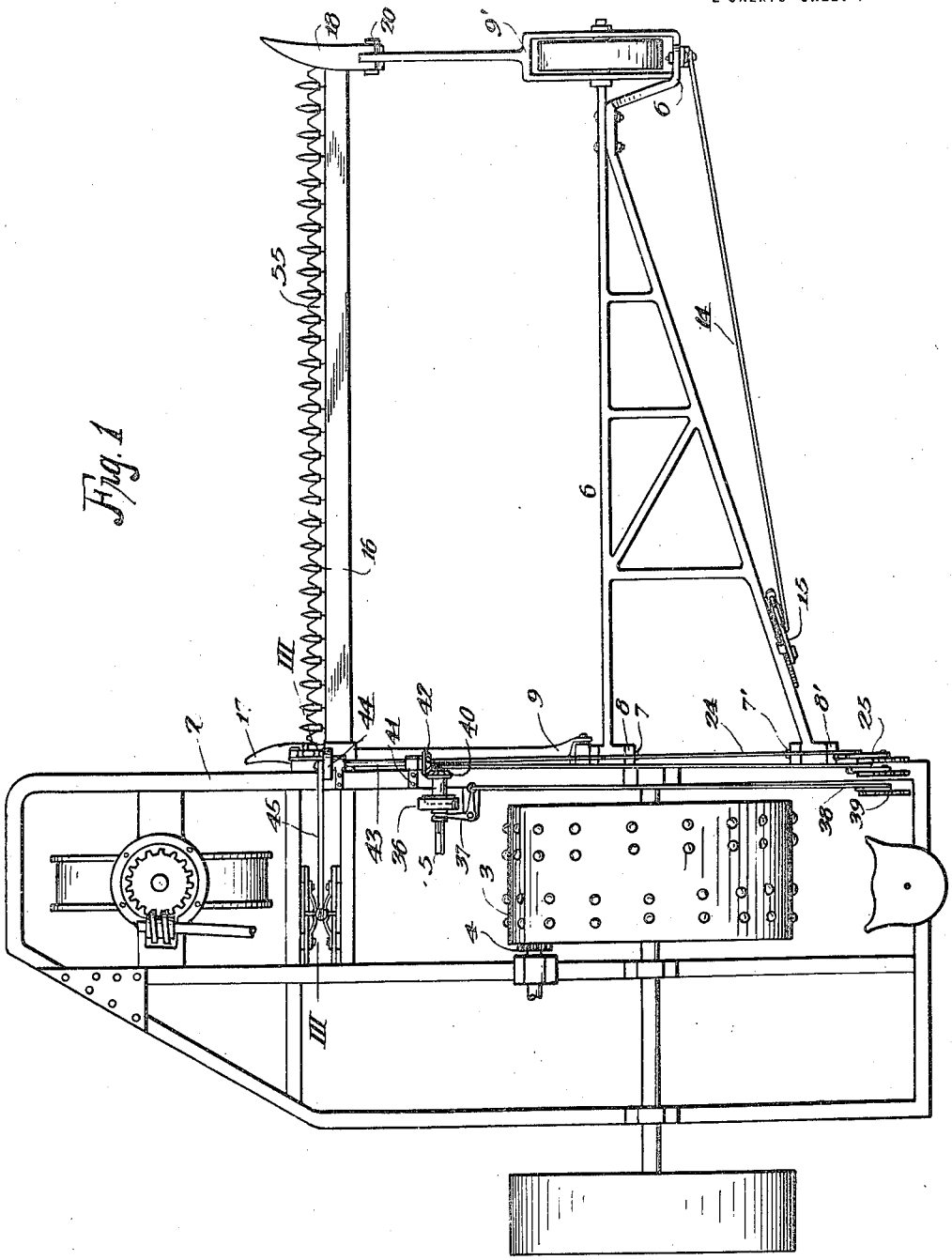

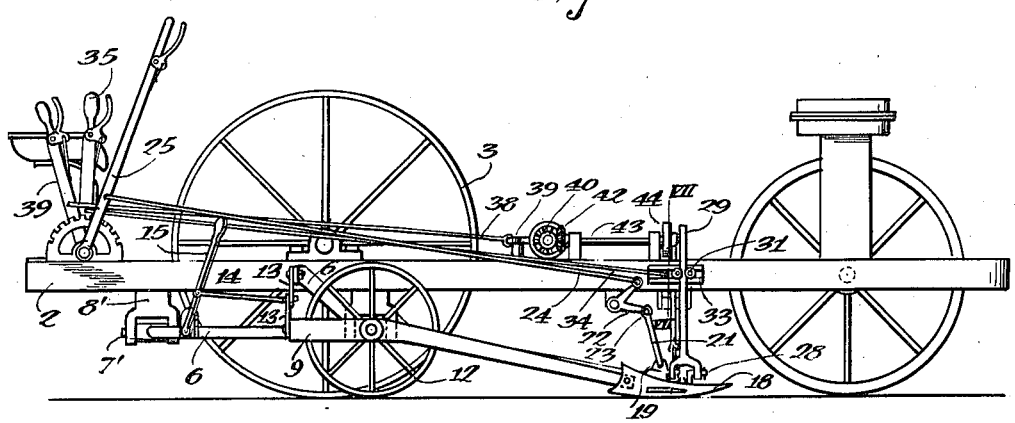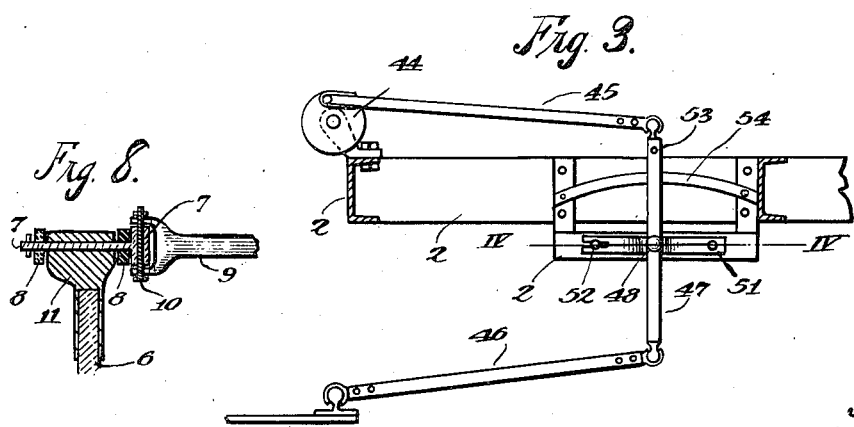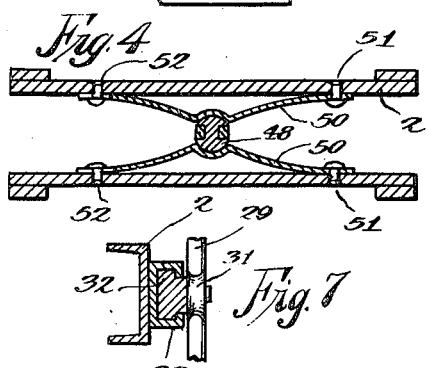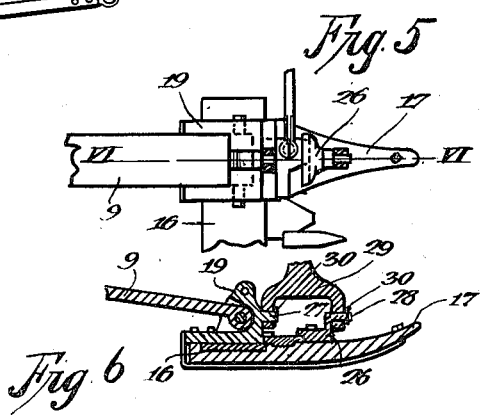

WILLIAM H. McCLURE, OF REPUBLIC, KANSAS.

POWER MOWING-MACHINE.

1,295,338.                Specification of Letters Patent.      Patented Feb. 25, 1919.

Application filed June 30, 1916. Serial No. 106,947.

*To all whom it may concern:*

Be it known that I, WILLIAM H. MCCLURE, a citizen of the United States, residing at Republic, in the county of Republic and State of Kansas, have invented certain new and useful Improvements in Power Mowing-Machines, of which the following is a specification.

This invention relates to power mowing machines and aims to provide a construction in which the main frame of the machine is provided with an auxiliary sickle bar frame having an improved arrangement of connections to the main frame for allowing all necessary relative movement according to the contour of the ground traversed by the machine. It is also sought to devise an auxiliary frame of this character which may be conveniently detached from the main frame of the machine, at the same time disconnecting the drive to the sickle bar, thus leaving the main or tractor portion of the machine free for use for other purposes.

It is also an object to provide a machine of this general type having cutting means constructed and arranged to automatically maintain its cutting angle substantially constant during its vertical movements in response to the ground contour, and provision is made for adjustment of the cutting angle independently of the vertical motion of said cutting means.

It is a further object to devise an improved means of transmitting the proper reciprocatory motion to the cutting mechanism, together with an improved arrangement of said transmitting means whereby the actuation of the cutting mechanism is automatically stopped upon its encountering an unusual obstruction.

With these general objects in view, and other minor objects as will hereinafter appear, the invention will now be described with reference to one embodiment thereof as illustrated in the accompanying drawings, in which—

Figure 1 is a top plan view of a mowing machine embodying the present improvements;

Fig. 2 is a side elevation of the same, on a smaller scale;

Fig. 3 is a front sectional view (on an enlarged scale) taken on the line III—III of Fig. 1, showing the manner of driving the sickle bar and construction of the break joint connection;

Fig. 4 is an enlarged sectional top plan view taken on the line IV—IV of Fig. 3;

Fig. 5 is an enlarged top plan view of the inner shoe of the sickle bar;

Fig. 6 is a sectional view, taken on the line VI—VI of Fig. 5;

Fig. 7 is an enlarged sectional view taken on the line VII—VII of Fig. 2, showing a detail of the connection for governing the angle of the cutting mechanism; and Fig. 8 is a detail sectional view of the forward pivot connection between the main and auxiliary frames.

Referring to the drawings in detail, these show a main tractor frame 2 provided with the traction wheel 3 and drive pinion 4 adapted to be driven from an engine (not shown) on the tractor frame, from which engine is also driven a shaft 5 for actuating the cutting mechanism as hereinafter described. To the side of the main tractor frame 2 is removably connected an auxiliary frame 6 carrying the cutting mechanism, connection being made by means of pivot pins 7 and 7' to castings 8 and 8', respectively, depending from said main frame. To the opposite ends of the auxiliary frame 6 are pivotally connected two arms 9 and 9', the arm 9 being bifurcated (see Fig. 8) and receiving a pivot pin 10 carried by one end of the pin 7, to which the auxiliary frame 6 is connected by means of a casting 11 pivoted on said pin. By means of the construction shown, the center of the pivot axis of the arm 9 is in a horizontal line with the axial line of the pivot pins 7 and 7' of the frame 6, whereby the outer end of said frame may be raised or lowered with a minimum derangement of the arm 9; for example, when the arm 9 is raised into line with the axis of the pins 7, 7', there is no derangement whatever of the arm 9 by the raising and lowering of the frame 6.

A wheel 12 supports the outer end of the auxiliary frame 6, the axle of said wheel being the pivot of the arm 9' which projects rearward of the axle and terminates beneath the outer end of the frame 6, and toggle links 13 (see Fig. 2) are provided for connecting said outer end of frame 6 and the rear end of the arm 9'. For operating these toggle links 13 a rod 14 connects the toggle-joint with a lever 15 carried by the auxiliary frame 6 within reach of the driver's seat. Obviously by operation of this lever 15 the forward end of the arm 9' may be raised or lowered for adjusting the elevation of the outer end of the finger bar 16 of the cutting mechanism.

The arms 9, 9', are pivotally connected, respectively, to the inner shoe 17 and the outer shoe 18, by corresponding castings 19 and 20 secured rigidly to said shoes. The casting 19 is bolted to the shoe 17 and inner end of the finger bar 16 (see Fig. 6), and to this casting 19 is pivotally connected a link 21 which is detachably connected by a pin 23 to one arm of a bell crank lever 22 mounted on the main frame 2. The other arm of said lever 22 is connected by a rod 24 to an operating lever 25 whereby the driver may control the elevation of the inner end of the cutting mechanism.

In front of the casting 19, a second casting 26 is bolted to the shoe 17 and coöperates with the casting 19 to form a guideway for the head of the sickle bar 55. The castings 19 and 26 are formed with forwardly projecting trunnions 27 and 28 respectively, over which the bifurcated end of the vertical arm 29 is fitted and held in place by the cotter pins 30. By this arrangement the cutting angle of the finger and sickle bars is controlled by moving the arm 29 back and forth, at the same time allowing the outer end of the finger bar to rise or fall without altering the angular relation of the arm 29 to the main frame 2. The arm 29 operates between a pair of grooved rollers 31 carried by a slide-block 32 mounted in a slideway formed in a casting 33 carried by the main frame 2, the movement of said block 32 being confined by said slideway in a direction parallel to the line of travel of the machine. The block 32 is joined by a rod 34 to a lever 35 located near the driver's seat.

The cutting mechanism is driven through the medium of an ordinary clutch 36 which is thrown in and out of gear by a bell-crank 37 connected by a rod 38 to a lever 39. This clutch drives a bevel gear 40 on the intermediate shaft 41, said gear 40 meshing with a gear 42 on one end of a shaft 43, the opposite end of which is provided with a crankwheel 44 located substantially in vertical line with the head of the sickle bar 55. Thus the crank-wheel and all shaft bearings connecting with the engine shaft 5 are carried by the main tractor frame 2. The drive from the crank-wheel 44 consists of two pitman arms 45 and 46 (see Fig. 3) connected, respectively, to the crank-wheel 44 and the sickle head and projecting out away from the sickle head and across the main frame. Connecting the outer ends of the arms 45 and 46 is a lever 47 provided intermediate its ends with a fulcrum pin 48 having rounded end portions (see Fig. 4) fitting in recesses in springs 50, one end of each spring 50 being securely bolted at 51 to the main frame 2, while the other ends of said springs are slotted for limited sliding engagement with pins 52. When the sickle bar 55 is suddenly stopped by an unusual force or jerk, the fulcrum pin 48 will push the springs 50 apart sufficiently to release the lever 47 from its normal position, whereupon the weight of the parts will cause them to drop until the nub or projection 53 on the lever 47 strikes the guideway 54 within which said lever operates. In this abnormal position the lever 47 is simply oscillated freely about its connection with the arm 46 without transmitting any reciprocating action to the sickle bar, so that an automatic releasing connection is thus provided between the sickle bar and its driving mechanism for effecting practically instantaneous release of the sickle bar from its drive and preventing any breakage of the moving parts.

From the foregoing it will be apparent that an efficient arrangement and construction have been devised for carrying out the purposes of the invention. By means of the levers 15 and 25 the elevation of the inner and outer ends, respectively, of the sickle and finger bars may be effectively controlled, and the tilt or angle of the sickle bar may be adjusted by means of the lever 35 and this angle maintained substantially constant independently of the vertical movement of the arm 29 as the sickle bar rises and falls about the axis of the arms 9, 9', in passing over uneven ground. With the arrangement and connections described for the auxiliary frame and cutting mechanism, the same may be readily and easily detached so as to permit the use of the main tractor frame for other purposes. This is done by disconnecting the rod 21 from the bell crank 22, removing the pins 7 and 7', detaching the pitman arm 46 from the lever 47, and disengaging the slide-block 32 from its slideway in the casting 33 and thus freeing the arm 29 from the tractor frame. The described drive mechanism constitutes an effective drive arrangement for reciprocating the sickle bar, all the drive parts being mounted on or suspended from the tractor frame, and the driving connection to the sickle bar is interrupted instantaneously by the releasing structure as specified, whenever the sickle bar encounters objects interposing an unusual obstruction thereto.

While I have herein specifically described and illustrated one embodiment which the invention may assume in practice, it is to be understood that the form chosen is used merely for purposes of illustration and that the invention may be embodied in other forms without departing from its spirit, it being my intention to include all such forms within the scope of the appended claims.

What I claim is:

1. A power mowing machine comprising, in combination, a main tractor frame, an auxiliary frame pivoted to one side of said main frame, a wheel supporting the outer end of said auxiliary frame, arms projecting forward from said auxiliary frame and pivoted thereto about an axis extending transversely of the machine, a sickle bar carried by the forward ends of said arms, and means for adjusting the axial position of said arms.

2. A power mowing machine comprising, in combination, a main tractor frame, an auxiliary frame removably pivoted to one side of said main frame, arms projecting forward from said auxiliary frame and pivoted thereto about an axis extending transversely of the machine, a sickle bar carried by the forward ends of said arms, and a lever carried by the pivoted end of said auxiliary frame and provided with connections to the arm supporting the outer end of the sickle bar for adjusting the elevation thereof.

3. A power mowing machine comprising, in combination, a main tractor frame, a finger bar pivotally carried by said frame for raising and lowering movement and also for movement about an axis extending transversely of the machine, an arm connected to said finger bar and projecting upward therefrom, and adjusting means for rocking said arm to tilt said bar about its transverse axis, said means including a horizontally sliding member having sliding engagement with said arm and permitting free vertical movement thereof.

4. A power mowing machine comprising, in combination, a main tractor frame, an auxiliary frame pivoted to one side of said main frame, a finger bar pivotally connected to said auxiliary frame for movement about an axis extending transversely of the machine, an arm projecting upwardly from said finger bar and pivoted thereto about an axis extending at right angles to said first axis for permitting raising and lowering of the auxiliary frame, and adjusting means for rocking said arm forward and backward to tilt said bar, said means including a horizontally sliding member having sliding engagement with said arm and permitting free vertical movement thereof.

5. A power mowing machine comprising, in combination, a main tractor frame, a finger bar pivotally carried by said frame for raising and lowering movement and also for movement about an axis extending transversely of the machine, an arm connected to said finger bar and projecting upward therefrom, a block slidingly mounted on the main frame, said arm being detachably engaged with said block and sliding freely therethrough in a substantially vertical direction, and means for adjusting the position of said block for rocking said arm to tilt the finger bar.

6. A power mowing machine comprising, in combination, a main tractor frame, an auxiliary frame removably pivoted to one side of said main frame, arms projecting forward from said auxiliary frame and pivoted thereto about an axis extending transversely of the machine, a sickle bar carried by the forward ends of said arms, means carried by the auxiliary frame for adjusting the position of the outer end of the sickle bar, and means carried by said main frame for adjusting the elevation of the inner end of said sickle bar.

7. A power mowing machine comprising, in combination, a main tractor frame, an auxiliary frame removably pivoted to one side of said main frame, arms projecting forward from said auxiliary frame and pivoted thereto about an axis extending transversely of the machine, a sickle bar carried by the forward ends of said arms, means for independently adjusting the elevation of the ends of said sickle bar, and means for tilting said sickle bar about the forward ends of said arms.

8. Sickle bar driving mechanism for mowing machines, comprising a reciprocating sickle bar, a rotary drive member, and connections between said rotary member and sickle bar including a lever and a yielding fulcrum-support for said lever adapted to release the latter upon the sickle bar's movements being obstructed.

9. Sickle bar driving mechanism for mowing machines, comprising a reciprocating sickle bar, a rotary drive member, a lever provided with pitman connections to said sickle bar and rotary member respectively, and a yielding fulcrum-support for said lever adapted to release the latter upon the sickle bar's movements being obstructed.

10. Sickle bar driving mechanism for mowing machines, comprising a reciprocating sickle bar, a rotating crank wheel, a lever provided with pitman connections to said sickle bar and wheel respectively, a yielding fulcrum-support for said lever adapted to release the latter upon the sickle bar's movements being obstructed, and supporting means for engaging the fulcrum of said lever when disengaged from said yielding support.

WILLIAM H. McCLURE.